United States Patent [19]

Walchhuetter

[11] 4,287,849

[45] Sep. 8, 1981

[54] APPARATUS FOR COATING CERAMIC TILES OR THE LIKE TO BE ADVANCED TO ROLLER TUNNEL KILNS

[76] Inventor: Ulrico Walchhuetter, Via Accademia 39, Milan, Italy

[21] Appl. No.: 64,624

[22] Filed: Aug. 7, 1979

Related U.S. Application Data

[62] Division of Ser. No. 16,895, Mar. 2, 1979.

[30] Foreign Application Priority Data

Mar. 24, 1978 [IT] Italy ................................ 21580 A/78

[51] Int. Cl.$^3$ .............................................. B05C 1/02
[52] U.S. Cl. .................................. 118/602; 118/221; 118/225; 118/239
[58] Field of Search ............... 427/428, 429, 216, 220, 427/58, 59; 118/602, 603, 239, 221, 236, 258, 222, 225; 432/2; 198/1 NQ; 264/62

[56] References Cited

U.S. PATENT DOCUMENTS

| | | | |
|---|---|---|---|
| Re. 28,947 | 8/1976 | Bowman | 118/324 X |
| 229,785 | 7/1880 | Whitney | 118/64 X |
| 1,535,850 | 4/1925 | O'Hara | 118/58 |
| 2,156,382 | 5/1939 | Ferla | 118/58 X |
| 2,875,094 | 2/1959 | Bloem et al. | 118/602 X |
| 3,068,119 | 12/1962 | Gotsch | 118/58 X |
| 3,365,326 | 1/1968 | Conrad | 118/602 X |
| 3,605,682 | 9/1971 | Groce et al. | 118/694 |
| 3,735,733 | 5/1973 | Henc | 118/262 X |
| 3,876,116 | 4/1975 | Kushimo et al. | 118/602 X |
| 4,102,302 | 7/1978 | Amberg et al. | 118/244 X |
| 4,183,885 | 1/1980 | Marazzi | 264/62 X |

*Primary Examiner*—John P. McIntosh
*Attorney, Agent, or Firm*—Michael J. Striker

[57] ABSTRACT

A method and apparatus for protecting the underface of ceramic or refractory tiles and the refractory rollers forming the advancing plane of a roller tunnel kiln during the firing and cooling of the tiles, in which to at least part of the underside of the tiles is applied a protective layer of a refractory material in suspension by an applicator, such as rollers, during advancement of the tiles by a conveyor into the kiln so that the protective layer is interposed between the underface of the tiles and the refractory rollers of the kiln preventing the tiles when heated and cooled from adhering or being welded to the refractory rollers.

4 Claims, 3 Drawing Figures

知4,287,849

APPARATUS FOR COATING CERAMIC TILES OR THE LIKE TO BE ADVANCED TO ROLLER TUNNEL KILNS

This is a division of application Ser. No. 16,895, filed Mar. 2, 1979.

BACKGROUND OF THE INVENTION

This invention relates to apparatus for protecting ceramic tiles and refractory rollers in roller tunnel kilns during the firing of said tiles.

In the production of tiles formed of ceramic or refractory material it is preferred to employ roller tunnel kilns for firing said tiles, the kiln consisting in a tunnel through which the tiles are advanced along a roller conveyor constituted by a stationary row of parallel, refractory rollers extending transversally to the longitudinal axis of the tunnel and individually rotated by light friction means about their own axis, at the same speed and direction of rotation.

Though roller tunnel kilns are preferred because of their high output and thermal efficiency, a frequent disadvantage occurs in the advancing of the tiles through the furnace zone and through the next cooling zone.

In the furnace zone, the rollers are stationary in position with respect to the advancing tiles, and they acquire a temperature greater than the temperature gained by the passing tiles and the temperature of the rollers in many cases exceeds the melting temperature of the ceramic or refractory material of the tiles. Consequently in the points of contact between the rollers and the passing tiles, the ceramic or refractory material is melted, even though the tiles are still allowed to advance into the furnace zone. However, when a melted tile enters the cooling zone, the molten material solidifies holding or welding the tile on at least a roller, impeding the rotation of the latter and thus the tile and the roller are stopped. In this event the successive tiles, arriving from the furnace zone, are stopped and they overlap each other or drop on the bottom of the kiln.

The overlapping creates extra weight on the rollers and may cause the breaking of the refractory rollers. In any case, the roller tunnel kiln has to be stopped and allowed to cool, so that a worker may enter through a provided manhole to remove the overlapped or dropped tiles, and, if necessary, replace the broken roller or rollers. The kiln is then again heated and the operation of the kiln is resumed. These operations require many hours during which the production is stopped.

A similar disadvantage is encountered because of drips of glaze material dropping on the refractory rollers, the glaze material being rendered semi-liquid along the furnace zone. In this event the glaze material dropped on the rollers stains the underface of the tiles and solidifies holding or welding the tile on, at least, a refractory roller.

In handling materials subject to said disadvantages, planar slaps of a refractory material have been employed, each supporting a discrete number of tiles, said planar slaps being themselves in contact with the refractory rollers.

The use of such slaps, however, incurs expenditure in purchasing them, in handling and in stocking them. Moreover they absorbed about 50% of the thermal energy supplied to the roller tunnel kiln, so the thermal efficiency of the kiln is very low.

SUMMARY OF THE INVENTION

This invention relates as aforesaid to apparatus for protecting ceramic tiles and refractory rollers in roller tunnel kilns during the firing of said tiles.

An object of the present invention is to provide a simple and speedy apparatus for eliminating the above mentioned disadvantages.

According to the present invention in one aspect there is provided a method for protecting the underface of ceramic or refractory tiles or the like and the refractory rollers forming the advancing plane of a roller tunnel kiln, during the firing and cooling of the tiles, comprising applying to at least part of the underface of said tiles a protective layer of a refractory material in suspension upstream of the entrance of the roller tunnel kiln and during advancement of said tiles into the roller tunnel kiln, so that said protective layer is interposed between the underface of the tile and the refractory rollers of the roller tunnel kiln.

Said layer of refractory material eliminates any possibility of adhesion or welding between the tiles and the rollers, so that the roller tunnel kiln may operate also at particularly high temperatures, allowing a high output of the roller kiln, also using glazes having a high baking point.

According to the present invention in another aspect there is provided an apparatus for carrying out the method of the invention, comprising conveyor means for conveying tiles towards the kiln, means disposed on the conveying path of the tiles for applying a protective layer of a refractory material in suspension to at least part of the underside of said tiles, means for supplying said applying means with a refractory material suspension, and means being provided for continuously mixing said refractory material suspension to maintain constant and uniform the density of said suspension.

BRIEF DESCRIPTION OF THE DRAWINGS

To the accomplishment of the foregoing and related ends, the invention then comprises the features hereafter fully described and particularly pointed out in the claims, the following description and annexed drawing setting forth in detail a certain illustrative embodiment of the invention, this being indicative however of only one way in which the principle of the invention may be employed.

In said annexed drawing.

DESCRIPTION OF THE PREFERRED EMBODIMENT

Referring to the Figures, reference 1 indicates a common tile formed of ceramic material which is provided on the underface with reliefs that are designed to facilitate the adherence of the tile 1 to a fixing material, such as cement, when installed. Said reliefs may have different shapes, for example they may be formed as circular rib elements regularly distributed on the underface, or as parallel ribs, or two sets of parallel ribs crossing each other.

Figure 2:
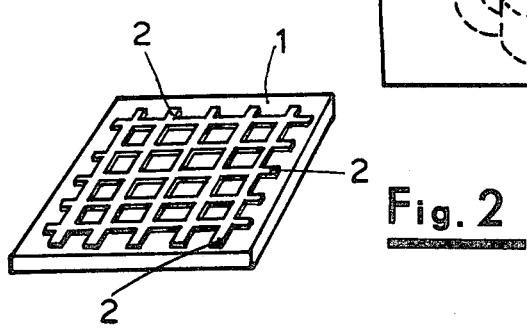
FIG. 2 is a perspective view of a tile showing the underface.

In the embodiment of FIG. 2, the reliefs on the underface of the tile 1 are constituted by two sets of ribs 2 of limited thickness, crossing each other at 90°, the ribs 2 of each set being regularly spaced on all the area of the underface.

Figure 1:
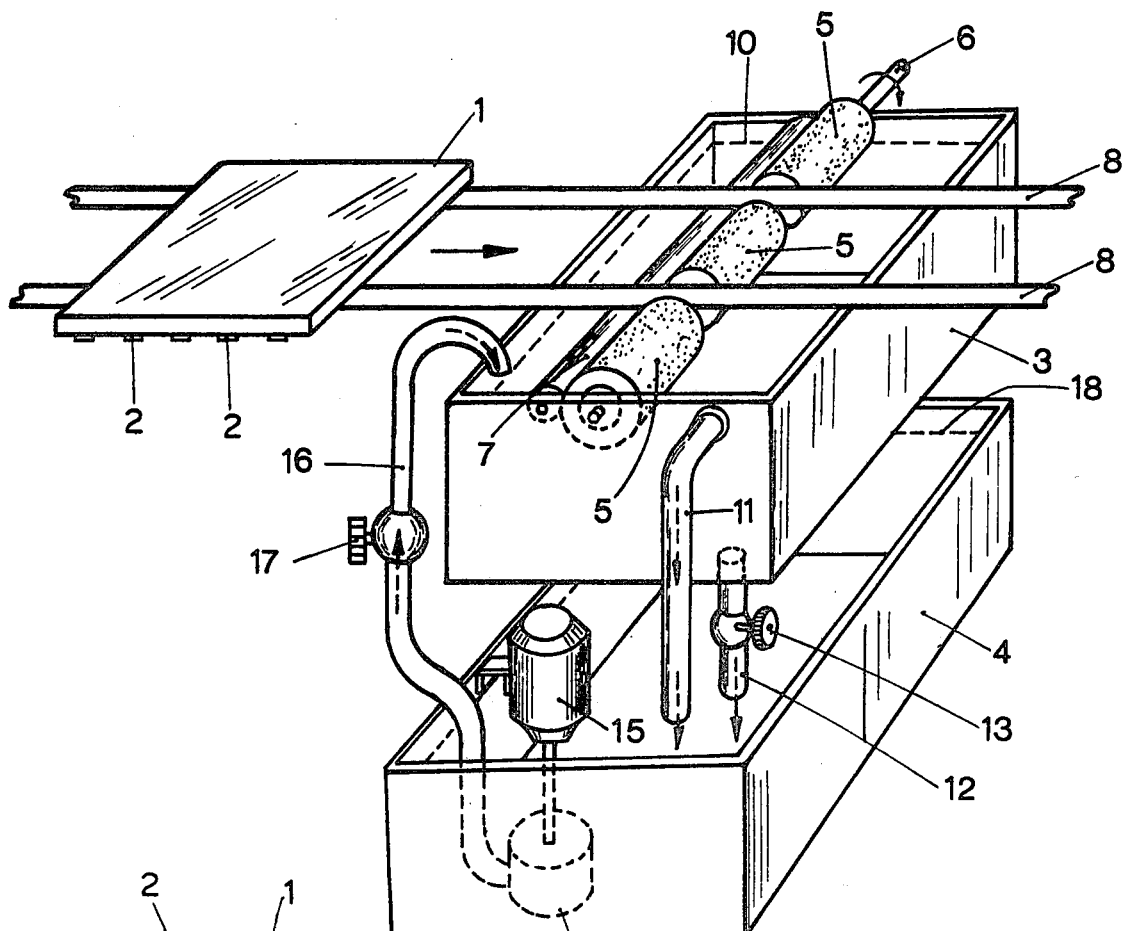
FIG. 1 is a diagrammatical perspective view of the apparatus.

For coating the underface of the tile 1 with a refractory material suspended in a liquid, such as water, an apparatus is provided as diagrammatically shown in FIG. 1, said apparatus being installed upstream of a roller tunnel kiln.

Said apparatus comprises a main tank 3 disposed in an upper position and a complementary tank 4 disposed in a lower position, both the tanks 3 and 4 containing an identical acqueous suspension of refractory material reduced to very fine particles. The main tank 3 is provided with horizontal coaxial rollers 5 which are partially received in the tank 3, said rollers 5 being formed of or covered with a liquid absorbent material, such as foamed plastics material, felt or similar material, and being mounted at a short distance from each other on a common horizontal shaft 6, that is continuously rotated by driving means, not shown in the drawing. The rollers 5 shown in the embodiment of FIG. 1 are three in number, but their number can be greater than or less than three.

The rollers 5 are mounted on the top of the main tank 3, end-to-end, with a squeeze roller 7 of smaller diameter, pressing against the rollers 5 and either idly mounted or connected to driving means. Said squeeze roller 7 has the function to remove any excess of the suspension absorbed by the roller 5. The rollers 5 project above the upper edge of the tank 3, so that they may be contacted by the underface of the tiles 1 advancing on a continuous conveyor.

The continuous conveyor may be constituted, as an example, by two parallel belts 8 passed around opposed pulleys, not shown, one of said pulleys being driven in rotation. Said belts 8 have an upper horizontal portion running at the level of the upper edge of the upper tank 3 and are passed through the spaces between adjacent rollers 5.

The displacement of the belts 8 from left to right, as viewed in FIG. 1, causes the displacement of the tiles 1 resting thereon, with their underface facing toward the main tank 3.

Figure 3:
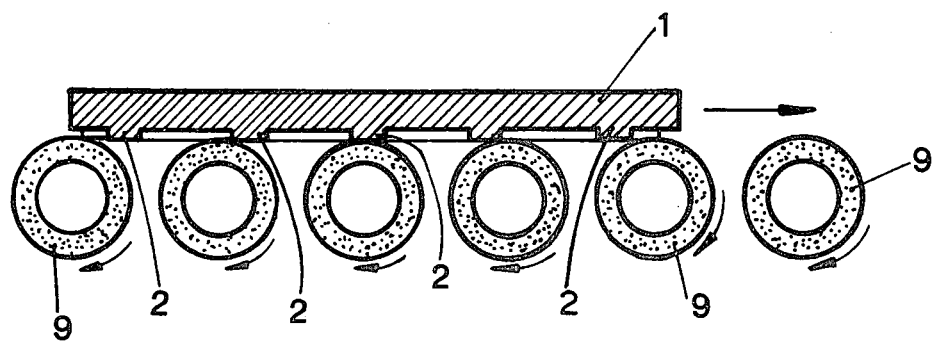
FIG. 3 shows in vertical section and on an enlarged scale compared with FIGS. 1 and 2, a tile proceeding along a portion of the advancing plane formed by refractory rollers.

The belts 8 extend up to the entrance of the roller tunnel kiln (not shown), so as to feed continuously the advanced tiles 1, transferring the same directly on the roller plane of said roller tunnel kiln (in FIG. 3 the rollers 9 are formed of refractory material and define the advancing plane of the roller kiln).

It is provided, moreover, that the level 10 of the suspension in the main tank 3 is maintained constant, so that the rollers 5 are always in contact with the suspension. The suspension is circulated in a closed circuit between the main tank 3 and the complementary tank 4, in such a manner that the particles of the refractory material are prevented from sinking to the bottom of the tank 3.

An overflow tube 11 is provided which is connected to the main tank 3 and discharges to the complementary tank 4, so that the level 10 is not exceeded in the tank 3, while a conduit 12, intercepted by a regulating valve 13, has its upper end opening on the bottom of the main tank 3 and the lower end discharging in the complementary tank 4.

A pump 14, driven by a respective electrical motor 15, is immersed in the complementary tank 4 and its output is connected to the main tank 3, through a conduit 16 intercepted by a regulating valve 17, so that the suspension is continuously passed from the lower tank 4 to the upper tank 3.

By means of the valves 13 and 17, a continuous circulation of liquid is attained between the main tank 3 and the complementary tank 4, maintaining always constant the levels 10 and 18 respectively, so that the refractory material in suspension is continuously mixed and so that the density of the suspension is maintained constant at any point of the circuit.

The method of the invention is carried out in the following manner.

The tiles 1, to be directed to the kiln, are placed on the conveying belts 8 with the reliefs 2 of the underface facing towards said belts 8. The tiles 1 are moved consecutively over the main tank 3, wherein they are contacted on their underside by the rollers 5 and coated with the refractory material suspension.

Preferably the distance between the rollers 5 and the underface of the tiles 1 is such that the rollers 5 only coat the reliefs 2 of the tile 1.

The tiles 1 are continuously advanced by the belts 8 up to the roller plane, formed by the refractory rollers 9 of the roller tunnel kiln.

The tiles 1 contact the refractory rollers 9 (FIG. 3) through their reliefs 2, whereupon the layer of refractory material suspension is applied. In the preheating zone of the roller tunnel kiln, the layer of refractory material is dried and the firing of the tiles 1 in the furnace zone may be carried out in a very regular manner, without adhesion or welding between the tiles 1 and rollers 4 takes place owing to the interposition of the refractory material layer applied on the reliefs 2.

Also in the event that drops of a semi-liquid glaze drop on the rollers 9, and the impregnated rollers stain the successive tiles, the setting of the glaze may not cause adhesion or welding, owing to the interposed layer on the reliefs 2 of the refractory material.

Moreover the use of said refractory material layer is useful in that it is partially transferred over the refractory rollers 9 coating them so that the semi-liquid glaze drops do not adhere to the rollers 9.

The refractory material suspension may be applied not only on the reliefs 2, but also on any other portion of the underface of the tiles 1 so that the desired results are attained. Moreover any excess of the suspension does not cause any inconvenience, excepting a dropping or staining on the refractory rollers 9 having no influence on the quality of tiles produced.

It is apparent that the method of the invention is carried out very easily with an apparatus very simple disposed upstream of the roller tunnel kiln, without any necessity to modify the roller tunnel kiln and without the necessity to slow the speed of the production in any manner. Moreover, the method of the invention allows utilization of the full output capacity of the roller tunnel kiln operation, the latter also at particular elevated temperatures, eliminating at all the risks of the obstruction of the kiln or of breaking of the refractory rollers 9 as a consequence of the holding or welding phenomena between the tiles and refractory rollers due to the overheating of the latter.

Obviously the invention is not limited to the sole embodiment described as many modifications and variations are possible within the scope of the appended claims either in the execution of the method and in the apparatus for applying the layer of the refractory material suspension.

The refractory material suspension may be applied on the underface of the tiles by spraying it with compressed air or by means of centrifugal discs or applying it by a silk-screen process.

I, therefore particularly point out and distinctly claim as my invention:

1. An apparatus for protecting ceramic tiles or the like to be advanced to roller tunnel kilns utilized for firing the ceramic tiles, comprising conveying means for advancing the tiles to be treated in a direction towards the kiln; a plurality of rotary rollers coaxially mounted to one another with a common axis extending in a direction transversal to the advancing direction; a first tank containing the refractory material suspension; a second tank containing the refractory material suspension and located below said first tank and in communication therewith; and means for circulating the refractory material suspension between said first and second tanks for maintaining constant and uniform density of the suspension, said rollers being partially extended into said first tank and adapted to contact the underside of the tiles for applying a protective layer of a refractory material in suspension only to the underside of the tiles when the latter pass said rollers in the advancing movement whereby said rollers absorb the material suspension and apply a protective layer to at least part of the underside of the tiles prior to entry of the same into the kiln.

2. The apparatus of claim 1, wherein said rollers are formed of absorbent material.

3. The apparatus of claim 1, wherein said rollers are covered with absorbent material.

4. The apparatus of claim 1, wherein said circulating means include a plurality of conduits for connecting said first and second tanks to each other, and an overflow tube to provide a constant level of the material suspension in said first tank.

* * * * *